United States Patent
Mukawa et al.

(10) Patent No.: US 7,699,473 B2
(45) Date of Patent: Apr. 20, 2010

(54) IMAGE DISPLAY APPARATUS WITH RELAYING OPTICAL SYSTEM, REFLECTIVE OPTICAL COMPONENT AND PHASE DIFFERENCE OPTICAL COMPONENT

(75) Inventors: Hiroshi Mukawa, Kanagawa (JP); Yasuyuki Sugano, Kanagawa (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 10/554,264

(22) PCT Filed: Mar. 7, 2005

(86) PCT No.: PCT/JP2005/003891

§ 371 (c)(1),
(2), (4) Date: Nov. 15, 2006

(87) PCT Pub. No.: WO2005/085933

PCT Pub. Date: Sep. 15, 2005

(65) Prior Publication Data

US 2007/0064310 A1    Mar. 22, 2007

(30) Foreign Application Priority Data

Mar. 8, 2004    (JP) .............................. 2004-064712

(51) Int. Cl.
G03B 21/00 (2006.01)
G03B 21/28 (2006.01)
G03H 1/00 (2006.01)
G02B 27/14 (2006.01)

(52) U.S. Cl. .............................. 353/33; 353/81; 359/13; 359/631

(58) Field of Classification Search .................. 353/33, 353/81; 359/13, 14, 629–632; 264/1.32
See application file for complete search history.

(56) References Cited

U.S. PATENT DOCUMENTS

| | | | |
|---|---|---|---|
| 5,886,822 A | 3/1999 | Spitzer | |
| 6,480,337 B2 * | 11/2002 | Inoguchi et al. | 359/630 |
| 6,879,443 B2 * | 4/2005 | Spitzer et al. | 359/630 |
| 6,880,931 B2 * | 4/2005 | Moliton et al. | 351/159 |
| 2002/0021498 A1 * | 2/2002 | Ohtaka et al. | 359/629 |

FOREIGN PATENT DOCUMENTS

| | | |
|---|---|---|
| JP | 10-153748 | 6/1998 |
| JP | 2000-511306 | 8/2000 |
| JP | 2002-287077 | 10/2002 |
| JP | 2003-315727 | 11/2003 |
| JP | 2003-337298 | 11/2003 |

OTHER PUBLICATIONS

Japanese Office Action dated Apr. 4, 2008 for corresponding Japanese Application No. 2004-064712.
International Search Report dated Jun. 21, 2005.

* cited by examiner

Primary Examiner—Georgia Y Epps
Assistant Examiner—Magda Cruz
(74) Attorney, Agent, or Firm—Rader, Fishman & Grauer PLLC (57) ABSTRACT

An image display apparatus for a viewer to view a two-dimensional image demonstrated on an image display device as an enlarged virtual image by a virtual-image optical system. The image display apparatus includes a prism and a reflective transmitting surface for reflecting or transmitting image light incident from an incident optical surface. The image display apparatus also includes a reflective optical component for reflecting image light reflected from the reflective transmitting surface and radiated from a first planar optical surface towards the reflective transmitting surface as a collimated light beam and a phase difference optical component arranged on a light path between the first planar optical surface and the reflective optical component to the state of polarization of the image light.

16 Claims, 9 Drawing Sheets

IMAGE DISPLAY APPARATUS WITH RELAYING OPTICAL SYSTEM, REFLECTIVE OPTICAL COMPONENT AND PHASE DIFFERENCE OPTICAL COMPONENT

TECHNICAL FIELD

This invention relates to an image display apparatus for allowing a two-dimensional image, demonstrated on an image display device, to be observed by a viewer as an enlarged virtual image by a virtual-image optical system employing reflective/transmitting (catadioptric) optical device. More particularly, it relates to a head-mounted type image display apparatus employing a virtual-image optical system.

The present invention contains subject matter related to Japanese Patent Application JP 2004-064712, filed in Japan on Mar. 8, 2004, the entire contents of which being incorporated herein by reference.

BACKGROUND ART

There has so far been proposed a head-mounted image display apparatus for allowing a two-dimensional image, demonstrated on an image display device, to be observed by a viewer as an enlarged virtual image by a virtual-image optical system employing a reflective/transmitting optical device. As typical of this sort of image display apparatus, there is an image display apparatus disclosed in U.S. Pat. No. 5,886,822. With the virtual-image optical system found in the image display apparatus disclosed in the Patent Publication, it is desirable to improve the mounting feeling by arranging the apparatus so as to conform the shape of the face of a user, in particular the shape of the face in the vicinity of his/her eyes. It is also desirable to reduce the thickness of the apparatus in a direction along the field of view and to improve the light utilization efficiency as much as possible.

DISCLOSURE OF THE INVENTION

Problems to be Solved by the Invention

Figure 1:
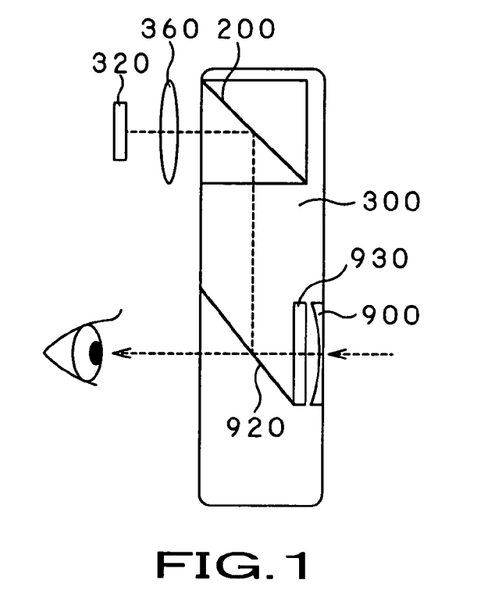
FIG. 1 is a side view showing a first virtual-image optical system provided to an image display apparatus which temporally precedes the present invention.

In the above Patent Publication, there is disclosed a virtual-image optical system shown herein in FIG. 1. In the virtual-image optical system shown in FIG. 1, S-polarized image light radiated from an image display device 320 is made to fall through a lens 360 on a prism 300. This image light is reflected by a first reflecting surface 200 provided in the prism 300 and is thereby changed in its proceeding direction by 90 degrees.

This image light is reflected predominantly by a second reflecting/transmitting surface 920 reflecting the S-polarized light and is thereby changed in its proceeding direction by 90 degrees so as to fall on a quarter wave plate 930. The image light incident on the quarter wave plate 930 is converted into circularly polarized light and is reflected by a concave mirror 900. The image light reflected by the concave mirror 900 again falls on the quarter wave plate 930 and is thereby converted into P-polarized light, which is then transmitted through the second reflecting/transmitting surface 920 to fall on a viewer's pupil.

With the virtual-image optical system shown in FIG. 1, the position of arranging the image display device 320 radiating the image light and the position of arranging the optical pupil where the image light is to get to ultimately need to be on the same side of the prism 300, so that it is difficult to achieve an optical arrangement lying along the viewer's face.

Moreover, 100% reflection of the image light on the first reflecting surface 200 cannot be achieved, so that the light utilization efficiency is appreciably lowered. Additionally, the image light radiated from the image display device 320 is bent 90 degrees by the first reflecting surface 200 provided in the prism 300, so as to be incident in this state on the second reflecting/transmitting surface 920. Hence, an angle of 45 degrees is needed as the tilt of the second reflecting/transmitting surface 920 provided in the prism 300, with the result that the prism 300 is increased in thickness along the direction of the field of view of the viewer.

Figure 2:
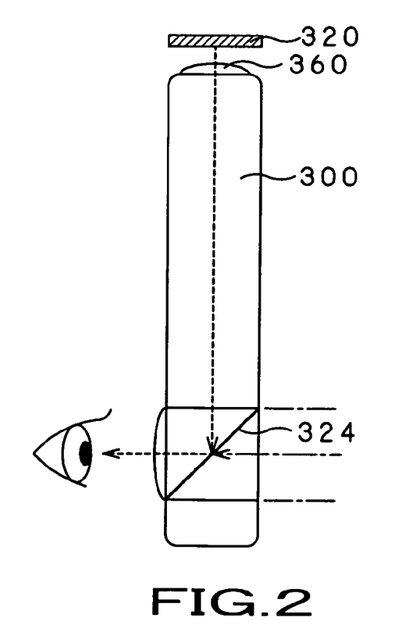
FIG. 2 is a side view showing a second virtual-image optical system provided to an image display apparatus which temporally precedes the present invention.

In the above Patent Publication, there is also disclosed a virtual-image optical system shown herein in FIG. 2. In this virtual-image optical system shown in FIG. 2, S-polarized image light radiated from an image display device 320 is made to be incident through a lens 360 on a prism 300. This image light is caused to be directly incident on a reflecting surface 324 provided in the prism 300. Thus, with the virtual-image optical system shown in FIG. 2, the number of times of reflection of the image light incident on and proceeding into the prism 300 is decreased, with the result that the light utilization efficiency may be prevented from being lowered.

With the virtual-image optical system shown in FIG. 2, as with the virtual-image optical system of FIG. 1, the image display device 320, a lens 360 and the prism 300 that are arranged along the length of the system are arranged on a single straight line to render it difficult to arrange the system along the viewer's face. In a similar manner, as in the virtual-image optical system shown in FIG. 1, the angle of 45° is needed as the tilt of the reflecting surface 324 provided in the prism 300, with the consequence that the prism 300 is thickened in a direction along the field of view of the viewer.

Figure 3:
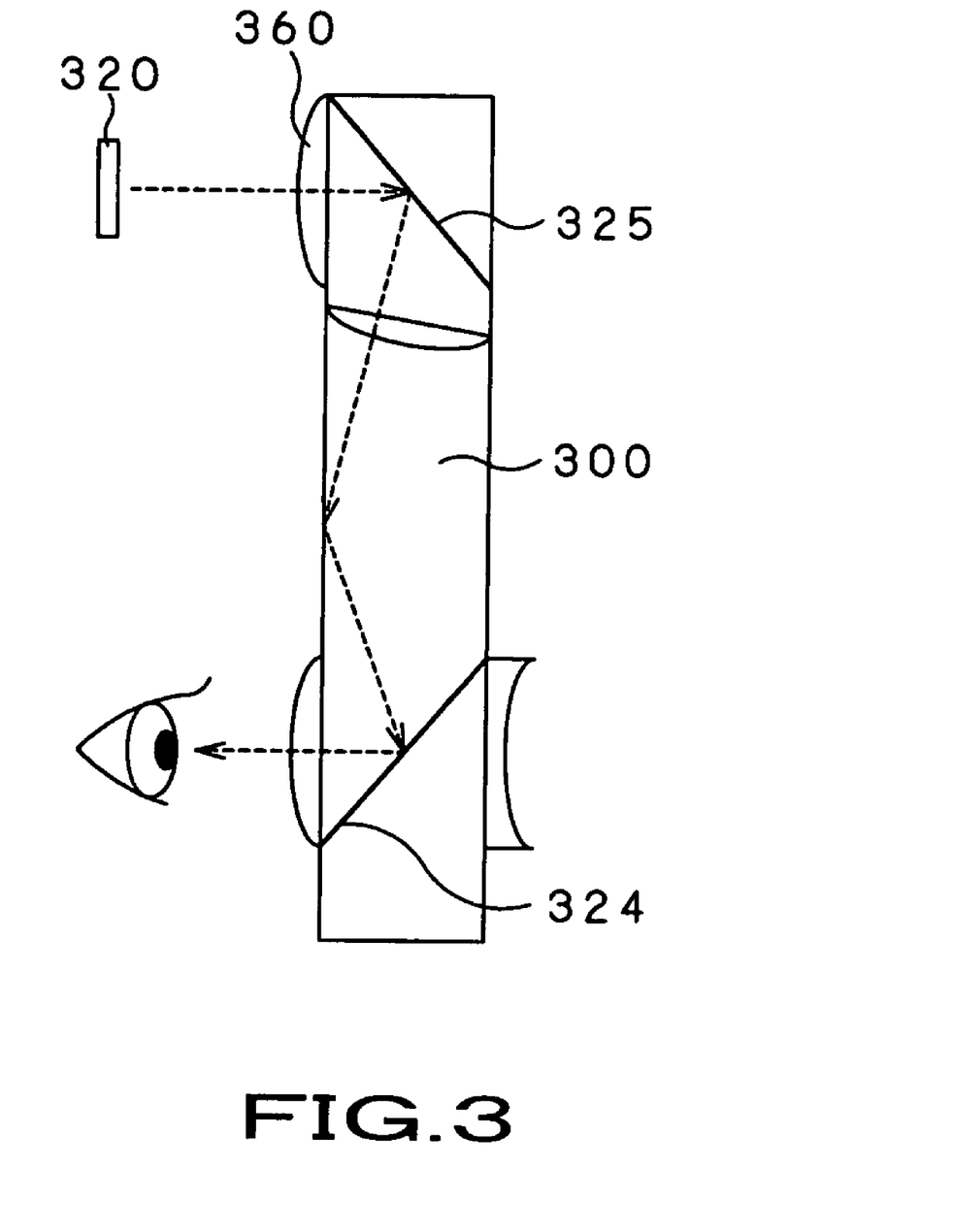
FIG. 3 is a side view showing a third virtual-image optical system provided to an image display apparatus which temporally precedes the present invention.

In the above Patent Publication, there is also disclosed a virtual-image optical system shown in FIG. 3. In this virtual-image optical system shown in FIG. 3, S-polarized image light radiated from an image display device 320 is made to be incident on and proceed into a prism 300 through a lens 360. This image light proceeding into the prism 300 is reflected by a first reflecting surface 325, arranged in the prism 300 at an angle of tilt exceeding 45 degrees, and reflected by total internal reflection within the prism 300. The image light is then reflected by a second reflecting surface 324 similarly arranged in the prism 300 at an angle of tilt exceeding 45 degrees, so as to be radiated to outside the prism 300.

In this manner, since the first reflecting surface 325 and the second reflecting surface 324 are arranged with a tilt of 45° or more in the prism 300, it is possible to prevent the prism 300 from being thickened in the direction along the viewer's field of view, as compared to the virtual-image optical system shown in FIG. 1 or 2.

However, with this virtual-image optical system, the image display device 320 radiating the image light and the optical pupil to which the image light is to get to ultimately need to be arranged on the same side of the prism 300, so that it is difficult to achieve an optical arrangement lying along the viewer's face.

On the other hand, in the virtual-image optical system shown in FIG. 1, the concave mirror 900, as a reflection optical element, is embedded in the prism 300. Consequently, the technique of guiding the image light by total reflection on the surface of the prism 300 cannot be used since the concave minor 900 is embedded in the prism 300, with the result that the prism 300 has to be of a certain thickness.

In the case of the virtual-image optical system shown in FIG. 3, in which the light is caused to undergo total internal reflection, a lens has to be used as an eye piece type optical component, chromatic aberration is produced, or the system is increased in thickness, due to the use of such lens.

The present invention has been proposed to overcome the above-described problem of the prior art and is aimed to provide a head-mounted image display apparatus in which an optical system is arranged to conform to the user's face shape and which has a virtual-image optical system having a reduced thickness in a direction along the viewer's field of view and realizing a high light utilization efficiency.

According to the present invention, there is provided an image display apparatus comprising an image display device for demonstrating an image, a relaying optical system for relaying image light of the image demonstrated on the image display device, a prism at least including a first planar optical surface, a second planar optical surface arranged substantially parallel to the first planar optical surface on a side towards an optical pupil, an incident optical surface which has an optical axis making an angle of not less than 30 degrees and less than 90 degrees with a normal to the first planar optical surface or to the second planar optical surface and on which is incident the image light relayed by the relaying optical system, and a reflective transmitting surface having a preset tilt relative to the first planar optical surface or the second planar optical surface and adapted for reflecting or transmitting the image light incident thereon from the incident optical surface, a reflective optical component arranged on a side towards the first planar optical surface of the prism and configured for reflecting the image light reflected on the reflective transmitting surface and radiated from the first planar optical surface towards the reflective transmitting surface as a substantially collimated light beam, and a phase difference optical component arranged on a light path of the first planar optical surface of the prism and the reflective optical component, sandwiching an air layer between the phase difference optical component and the first planar optical surface or the reflective optical component, the phase difference optical component changing the state of polarization of the image light, the prism guiding the image light incident on and proceeding into the prism from the incident optical surface up to the reflective transmitting surface as the image light undergoes internal total reflection on the first planar optical surface and on the second planar optical surface, and an intermediate image of the image being formed in the course of guiding the image light.

According to the present invention, there is also provided an image display apparatus comprising an image display device for demonstrating an image, a relaying optical system for relaying image light of the image demonstrated on the image display device, and a prism at least including a first planar optical surface, a second planar optical surface arranged substantially parallel to the first planar optical surface on a side towards an optical pupil, an incident optical surface which has an optical axis including an angle of not less than 30 degrees and less than 90 degrees with a normal to the first planar optical surface or with a normal to the second planar optical surface, and on which is incident the image light relayed by the relaying optical system, and a reflective transmitting surface having a preset tilt relative to the first planar optical surface or the second planar optical surface and adapted for reflecting or transmitting the image light incident thereon from the incident optical surface. The image display apparatus also includes a reflective optical component arranged towards the first planar optical surface of the prism and configured for reflecting the image light reflected on the reflective transmitting surface and radiated from the first planar optical surface towards the reflective transmitting surface as a substantially collimated light beam and a phase difference optical component arranged on a light path of the first planar optical surface of the prism and the reflective optical component, sandwiching an air layer between the phase difference optical component and the first planar optical surface or the reflective optical component. The phase difference optical component changes the state of polarization of the image light. The prism guides the image light incident on and proceeding into the prism from the incident optical surface, up to the reflective transmitting surface as the image light undergoes internal total reflection on the first planar optical surface.

According to the present invention, there is provided an image display apparatus comprising an image display device for demonstrating an image, a relaying optical system for relaying image light of the image demonstrated on the image display device, and a prism at least including a first curved optical surface, a second curved optical surface arranged substantially parallel to the first curved optical surface on a side towards an optical pupil, an incident optical surface on which is incident the image light relayed by the relaying optical system, and a reflective transmitting surface having a preset tilt relative to the first curved optical surface and the second curved optical surface and adapted for reflecting or transmitting the image light incident thereon from the incident curved optical surface. The image transmitting apparatus also includes a reflective optical component arranged towards the first curved optical surface of the prism and configured for reflecting the image light reflected on the reflective transmitting surface and radiated from the first curved optical surface towards the reflective transmitting surface as a substantially collimated light beam and a phase difference optical component arranged on a light path of the first curved optical surface of the prism and the reflective optical component, sandwiching an air layer between the phase difference optical component and the first curved optical surface or the reflective optical component. The phase difference optical component changes the state of polarization of the image light. The prism guides the image light incident on and proceeding into the prism from the incident optical surface up to the reflective transmitting surface as the image light undergoes internal total reflection on the first curved optical surface and on the second curved optical surface. An intermediate image of the image is formed in the course of guiding the image light.

According to the present invention, there is also provided an image display apparatus comprising an image display device for demonstrating an image, a relaying optical system for relaying image light of the image demonstrated on the image display device, and a prism at least including a first curved optical surface, a second curved optical surface arranged substantially parallel to the first curved optical surface on a side towards an optical pupil, an incident optical surface on which is incident the image light relayed by the relaying optical system, and a reflective transmitting surface having a preset tilt relative to the first curved optical surface and the second curved optical surface and adapted for reflecting or transmitting the image light incident thereon from the incident curved optical surface. The image display apparatus also includes a reflective optical component arranged towards the first curved optical surface of the prism and configured for reflecting the image light reflected on the reflective transmitting surface and radiated from the first curved optical surface towards the reflective transmitting surface as a substantially collimated light beam and a phase difference optical component arranged on a light path of the first curved optical surface of the prism and the reflective optical component, sandwiching an air layer between the phase difference optical component and the first curved optical surface or the reflective optical component. The phase difference optical component changes the state of polarization of the image light. The prism guides the image light incident on and proceeding into the prism from the incident optical surface up to the reflective transmitting surface as the image light undergoes internal total reflection on the first curved optical surface.

With the image display apparatus according to the present invention, in which the angle the optical axis of the incident optical surface of the prism makes with a normal to the first or second planar optical surface is set to not less than 30 degrees and less than 90 degrees, the virtual-image optical system may be arranged to conform to the face shape of the viewer, instead of in a straight line. This relieves the disagreeable feeling the viewer would have when he/she wears the display apparatus and, at the same time, improves the design properties of the apparatus.

By guiding the image light by total internal reflection within the prism, the light utilization efficiency may be higher than with a virtual-image optical system configured to guide the light with the use of, e.g., a reflective mirror.

In addition, when the virtual optical system of the image display apparatus embodying the present invention is of the coaxial optical system, the prism may be reduced in thickness along the direction of the field of view of the viewer, within an angular extent defined by A=2C, where A is an angle the optical axis of the incident optical surface makes with the normal to the first or second planar optical surface and C is an angle the reflective and transmitting surface of the prism makes with the first planar optical surface.

Moreover, with the image display apparatus of the present invention, having a prism including a first curved optical surface and a second curved optical surface, the virtual-image optical system may be optically arranged to conform to the face shape of the viewer instead of on a straight line. This relieves the disagreeable feeling the viewer would have when he/she wears the display apparatus and, at the same time, improves the design properties of the apparatus.

Other objects and advantages of the present invention will become more apparent from the following explanation of preferred embodiments thereof, especially when read in conjunction with the drawings.

BEST MODE FOR CARRYING OUT THE INVENTION

In the following, certain preferred embodiments of the present invention will be explained in detail with reference to the drawings.

First Embodiment

Figure 4:
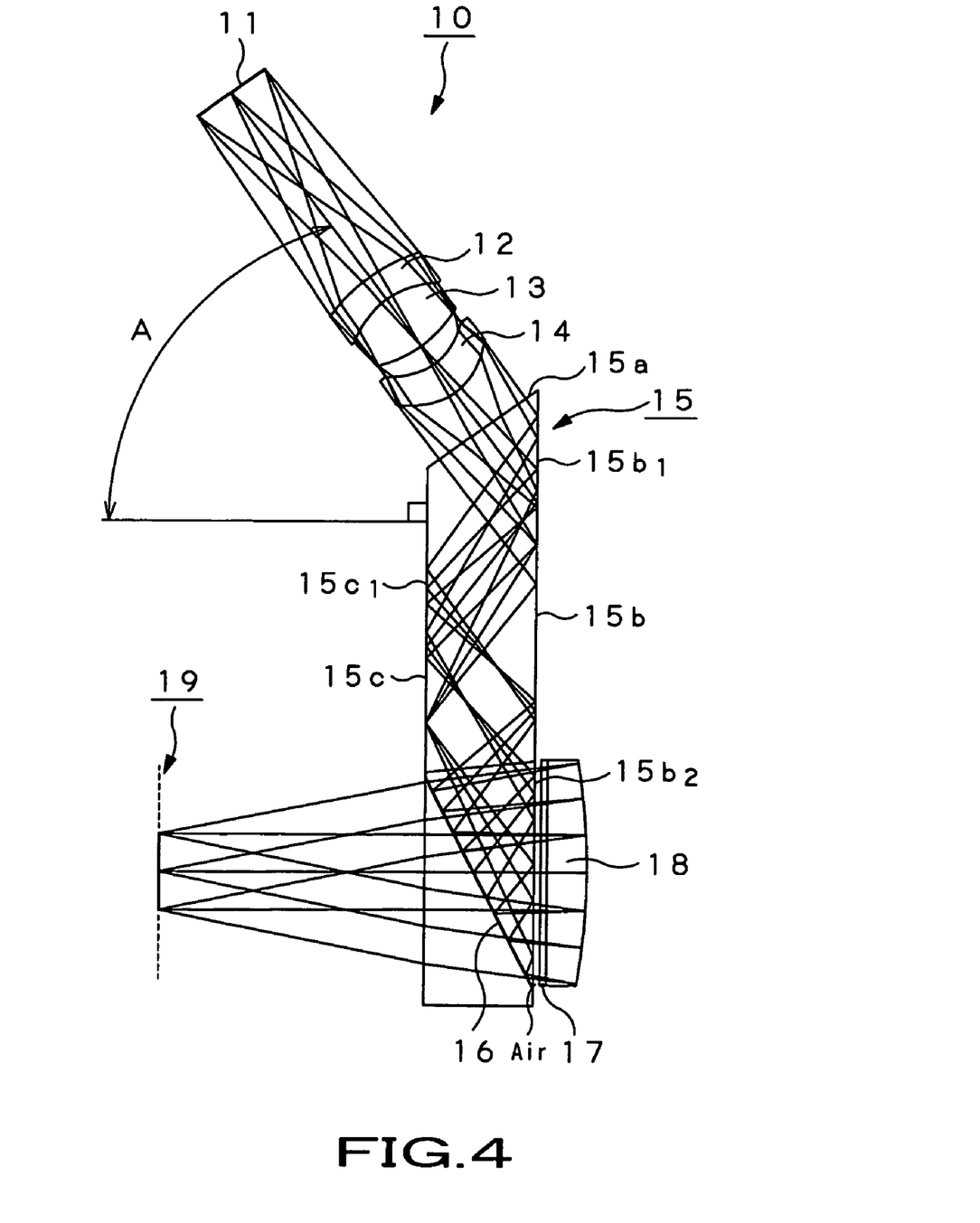
FIG. 4 is a plan view showing a first embodiment of an image display apparatus according to the present invention.

Referring to FIG. 4, a first embodiment of the present invention will be explained. An image display apparatus 10 shown in FIG. 4 includes an image display device 11 for displaying an image and a virtual-image optical system, on which falls image light of an image demonstrated on the image display device 11 and which guides the light to an optical pupil 19.

The image display device 11 may, for example, be an organic EL (electro-luminescence) display, an inorganic EL display or a liquid crystal display (LCD).

Meanwhile, in the present embodiment, a display radiating linearly polarized light, such as liquid crystal display, is used as the image display device 11. In case a display radiating non-polarized image light is used as the image display device 11, it is necessary to provide a polarizing plate in the rear of the image display device 11 for taking out linearly polarized light from the non-polarized light.

In the present embodiment, the image light radiated from the image display device 11 is assumed to be S-polarized light for the convenience for explanation.

A virtual-image optical system includes relay lenses 12 to 14, a prism 15 having an internal polarization beam splitter surface 16, a quarter wave plate 17 and a concave minor 18. These optical components making up the virtual-image optical system, i.e. the relay lenses 12 to 14, a prism 15, a polarization beam splitter surface 16 in the prism 15, a quarter wave plate 17 and the concave mirror 18, are arranged in the light path of the image display device 11 and the optical pupil 19, as shown in FIG. 4. The virtual-image optical system in the image display apparatus 10 forms a co-axial optical system exhibiting optical axis symmetry with the optical axes of optical surfaces of the relay lenses 12 to 14, the prism 15, the polarization beam splitter surface 16, the quarter wave plate 17 and the concave minor 18 all being coincident with one another.

Figure 5:
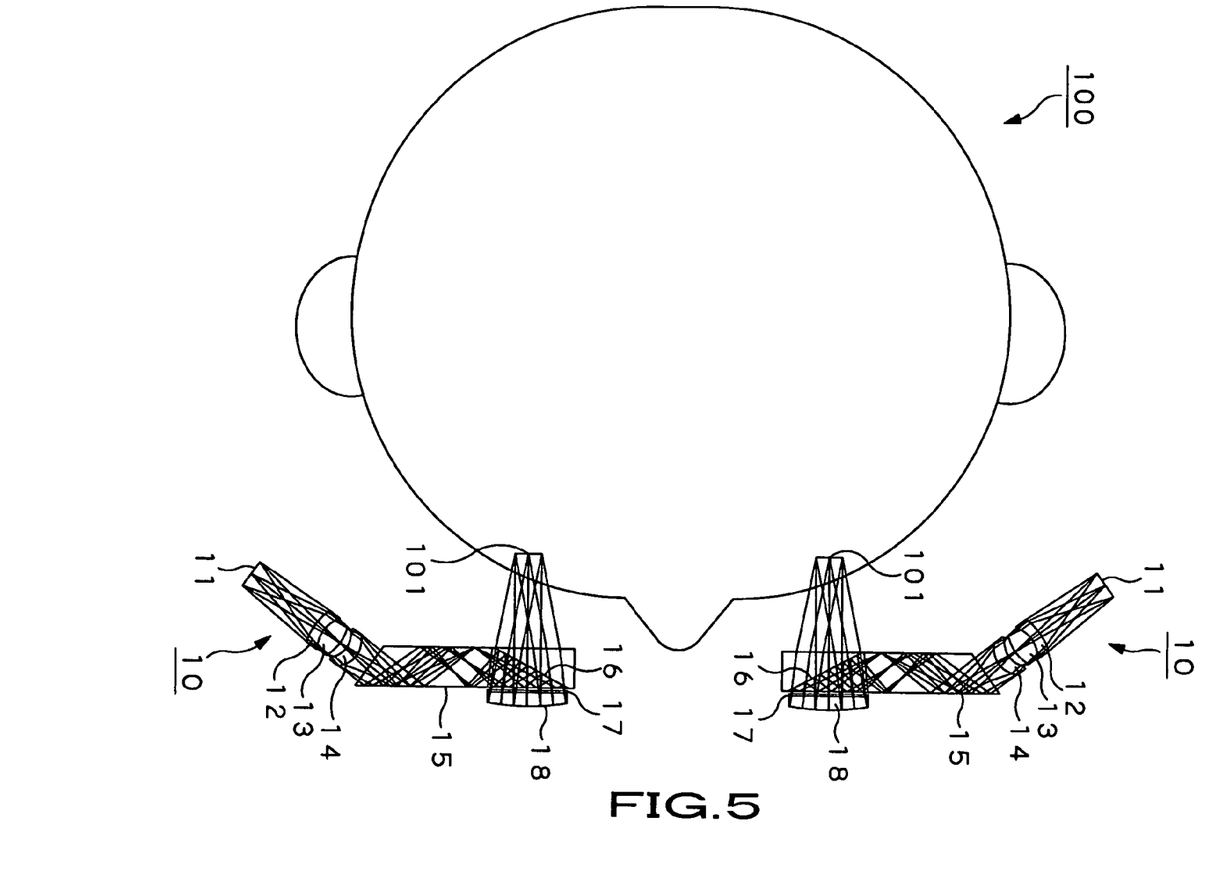
FIG. 5 is a plan view showing the configuration of use of the image display apparatus.

Referring to FIG. 5, a viewer 100, with his/her pupil 101 at the location of the optical pupil 19, is able to observe image light demonstrated on the image display device 11 to an enlarged scale via this virtual-image optical system. In FIG. 5, the image display device 11 and the relay lenses 12 to 14 provided to the image display apparatus 10 are profiled to conform to the shape of the head of the viewer 100.

The relay lenses 12 to 14 relay the image light, which is S linearly polarized light, radiated from the image display device 11 to the downstream side prism 15. In the image display apparatus 10 shown as the first embodiment, the relay lenses 12 to 14 form an intermediate image of the image light within the downstream side prism 15.

The image display device 11 and the relay lenses 12 to 14 are arranged parallel to an optical surface 15a of the prism 15, as later explained, that is, so that the optical axes of the optical components will be coincident with one another. The prism 15 is arranged so that the image light, as S linearly polarized light radiated from the image display device 11 and incident on the prism via the relay lenses 12 to 14, will be incident on the optical surface 15*a* and then will undergo total internal reflection twice on a first optical surface 15*b* and once on a second optical surface 15*c*, arranged substantially parallel to the first optical surface 15*b*. It should be noted that the present invention is not limited to the number of times of total internal reflection by the first and second optical surfaces of the image light incident on and proceeding into the prism 15.

The incident optical surface 15*a* is provided to the prism 15 so that an angle A the optical axis of the incident optical surface makes with a normal to the first optical surface 15*b* or with a normal to the second optical surface 15*c* ranges between a value not less than 30 degrees and a value less than 90 degrees. The angular extent of this angle A will be explained later in more detail.

The image light incident on the optical surface 15*a* undergoes a first total reflection in an area 15*b*1 of the first optical surface 15*b*, a second total reflection in an area 15*c*1 of the second optical surface 15*c* and a third total reflection in an area 15*b*2 of the first optical surface 15*b* again. The image light subjected to the total reflection in the area 15*b*2 is incident on the polarization beam splitter surface 16 formed as a reflective transmitting surface within the prism 15. The image light, incident on and proceeding into the prism 15, undergoes total reflection in the area 15*c*1 of the second optical surface 15*c* and subsequently forms an intermediate image in the prism 15. By forming the intermediate image within the prism 15, it is possible to provide for a larger size of the virtual image, to be observed to an enlarged size, even though the focal length is short. That is, with the virtual-image optical system forming the intermediate image, it becomes possible to earn the focal length.

The polarization beam splitter surface 16 is a reflective transmitting surface for reflecting or transmitting the incident image light depending on different sorts of polarized light of the incident image light. The polarization beam splitter surface 16 reflects the S linearly polarized light while transmitting P linearly polarized light oscillating in a surface of oscillations normal to the surface of oscillation of the S linearly polarized light. Hence, the image light reflected by second total reflection in the area 15*b*2 of the first optical surface 15*b* is incident on and reflected by this polarization beam splitter surface 16. The image light reflected by the polarization beam splitter surface 16 is incident on the area 15*b*2 of the first optical surface 15*b* at an angle within the critical angle, that is, at an angle that does not satisfy the condition of total reflection. Hence, such image light is radiated to outside the prism 15. The image light radiated to outside the prism 15 is incident on the quarter wave plate 17.

The reflecting/transmitting surface, formed in the prism 15 is the polarization beam splitter surface 16 that is adapted for reflecting or transmitting the polarized light depending on the difference as to the direction of oscillations of the linearly polarized light. However, the present invention is not limited to this, and a multi-layered dielectric membrane, or a holographic layer whose reflection/transmission characteristics are changed with the angle of incidence of the image light may, for example, be used as a reflecting transmitting surface.

The quarter wave plate 17 is a phase difference optical component for changing the polarized state of the incident image light, and it transforms the incident linearly polarized light or the incident circularly polarized light into the circularly polarized light or into the linearly polarized light, respectively. Specifically, the quarter wave plate 17 transforms the image light, as S-linearly polarized light radiated from the prism 15, into left-hand circularly polarized light.

The quarter wave plate 17 also transforms the image light, turned into the right-hand circularly polarized light on reflection by the downstream side concave mirror 18, into P-linearly polarized light.

The quarter wave plate 17 is provided to the concave mirror 18, arranged in the vicinity of the area 15*b*2 of the first optical surface 15*b* of the prism 15. The concave mirror 18 provided with the quarter wave plate 17 is arranged so as to provide an air layer Air of a preset distance between it and the first optical surface 15*b*. This air layer Air is provided so that the image light incident on and proceeding into the prism 15 will undergo a second total reflection within the area 15*b*2.

The quarter wave plate 17 may directly be affixed to the area 15*b*2 of the first optical surface 15*b*, in a manner not shown. In this case, the air layer Air is provided between the quarter wave plate 17 and the concave mirror 18.

The concave mirror 18 affords the positive optical power for forming a virtual image to the image light, radiated from the quarter wave plate 17 as left-handed circularly polarized light, and reflects the light as a substantially collimated light beam, which is again caused to fall on the quarter wave plate 17.

The image light, as left-handed circularly polarized light incident on the quarter wave plate 17, is turned into P linearly polarized light, which is incident on and proceeds into the prism 15. This image light is transmitted through the polarization beam splitter surface 16 and again radiated to the prism 15 to get to the optical pupil 19.

The angular extent of the angle A, the optical axis of the incident optical surface 15*a* makes with the normal to the first optical surface 15*b* or with the second optical surface 15*c*, will now be explained. This angle A is in a range from not less than 30 degrees and less than 90 degrees, as mentioned above. In the image display apparatus 10, the optical axes of the image display device 11 and the relay lenses 12 to 14 are arranged so as to be coincident with the optical axis of the incident optical surface 15*a*.

The case of the upper limit of the angle A being 90 degrees is first explained. In the case where the angle A is 90 degrees the optical axis of the incident optical surface 15*a* of the prism 15 is perpendicular to a normal to the first optical surface 15*b* or to the second optical surface 15*c*. That is, if the position of the incident optical surface 15*a* in the prism 15 is set so that the angle A is equal to 90 degrees, and the image display device 11 as well as the relay lenses 12 to 14 are arranged accordingly, the optical arrangement achieved is in total disregard of the shape of the viewer's face, such that, when the resulting image display apparatus 10 is worn on the head part of the user, the alien feeling the apparatus imparts to the user will be maximum. Hence, the angle A is set to a value less than 90 degrees.

The case of the angle A being the lower limit value of 30 degrees will now be explained. The lower limit value of the angle A is determined by the conditions under which a main light beam of the center image angle of the image light radiated from the image display device 11 undergoes total reflection within the prism 15. The angle A is smallest when the prism 15 is formed of an optical material having the maximum refractive index known to date.

Figure 6:
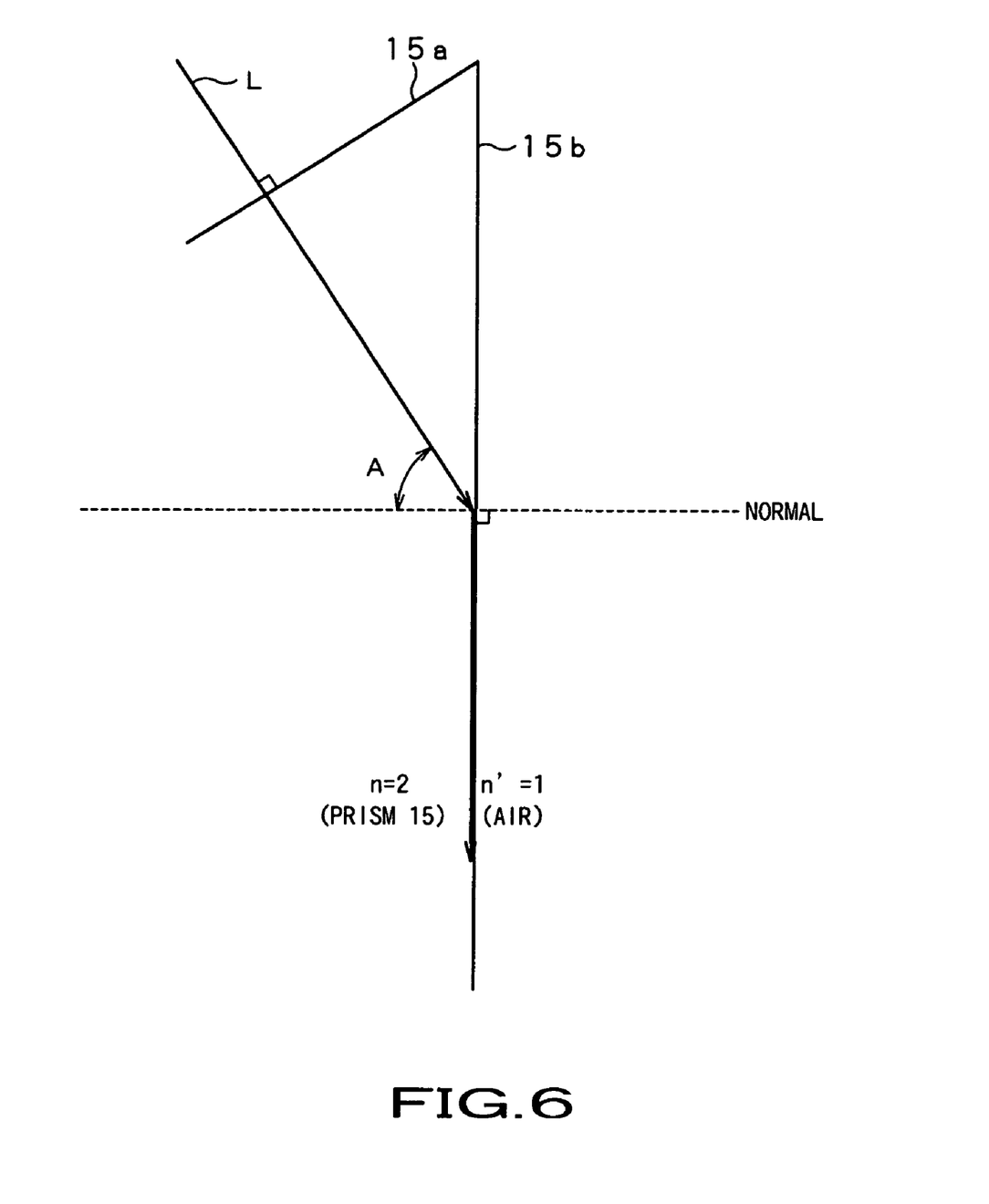
FIG. 6 is a light path diagram showing an angle with which the image light falls on a prism provided to the image display apparatus.

Specifically, the angle A (critical angle) may be found from the conditions under which the main light beam L of the center image angle of the image light radiated from the image display device 11 is incident on and proceeds into the prism 15 from the optical surface 15*a* to undergo internal total reflection on the first optical surface 15*b*, as shown in FIG. 6.

That is, if with the refractive index n equal to 2 and the refractive index n' equal to 1 the Snell's law is applied so that angle A will be equal to the critical angle, 2·sin A=1·sin 90°=1, so that sin A=1/2, and hence A is equal to 30 degrees.

In this manner, the angular range of the angle A may be set to not less than 30 degrees and less than 90 degrees.

The virtual-image optical system of the image display apparatus 10 is a coaxial optical system exhibiting optical axis symmetry, with the optical axes of the optical surfaces of the relay lenses 12 to 14, prism 15, the internal polarization beam splitter surface 16, the quarter wave plate 17 and the concave minor 18 all being confounded, as described above.

Figure 7:
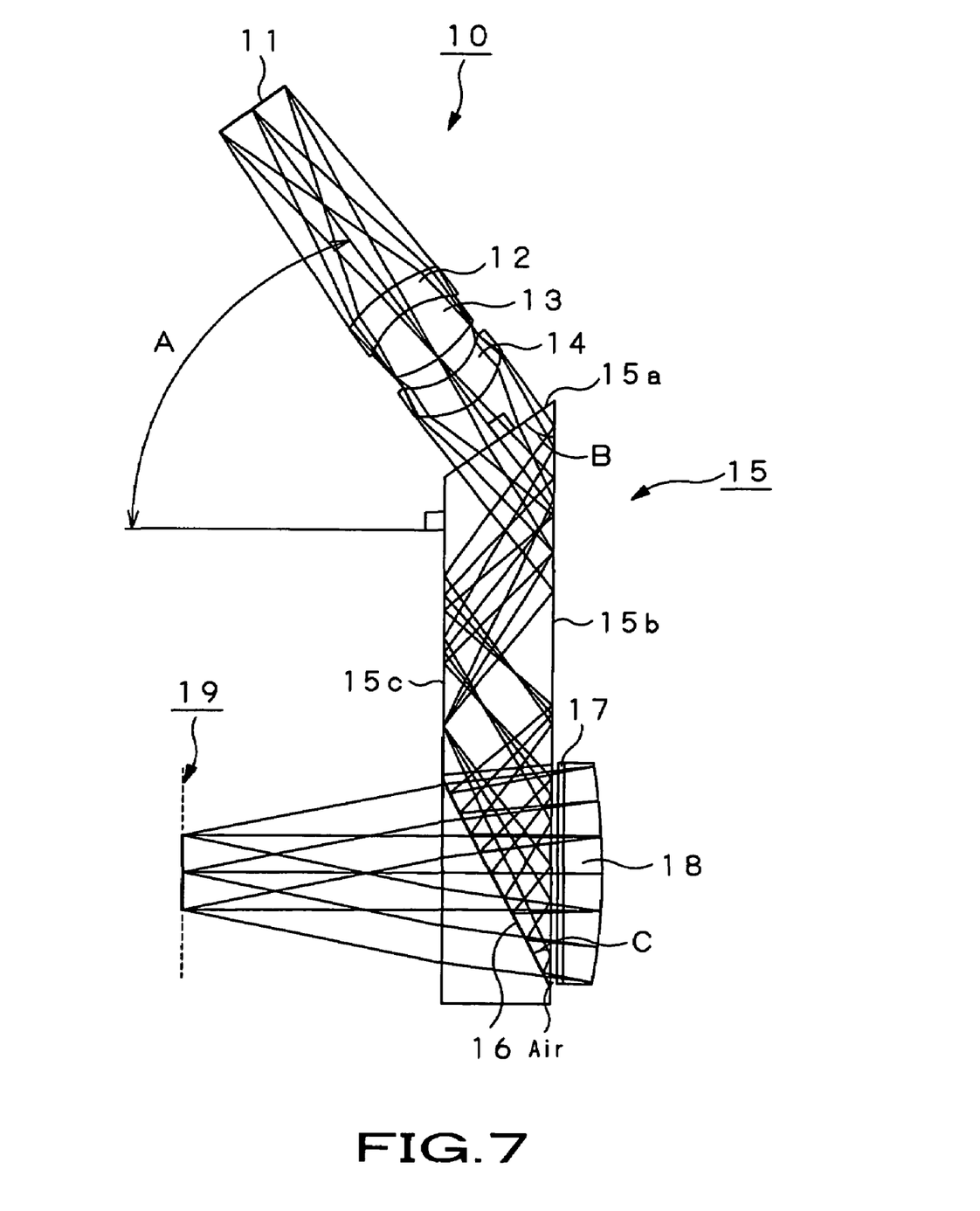
FIG. 7 is a light path diagram showing a case where the angle with which the image light falls on a prism provided to the image display apparatus is further prescribed depending on the shape of the prism.

With the above-described virtual-image optical system of the image display apparatus 10 as the coaxial optical system, the aforementioned angle A may further be prescribed by an angle defined between the polarization beam splitter surface 16 arranged within the prism 15 and the first optical surface 15b, that is, an angle C. Since this angle C is an angle defined between the polarization beam splitter surface 16 and the first optical surface 15b, the smaller the value of the angle C, the narrower may be the spacing between the first optical surface 15b and the second optical surface 15c of the prism 15, with the result that an extremely thin thickness of the prism 15 may be achieved. It should be noted however that the angle C cannot be limitlessly reduced, such that, if the image display apparatus is mounted on the head part of the viewer and a sufficient angle of field as well as optimum eye relief is to be achieved, the angle C is required to be some sizable angle.

The relationship between the angles A and C will now be explained. First, the angle C has the relationship as indicated by the following equation (1):

$$B-2C=0 \tag{1}$$

with respect to the angle B, where B is an angle the first optical surface 15a makes with the first optical surface 15b.

This equation (1) needs to be met in order that the image light incident on and proceeding into the prism 15 from the incident optical surface 15a to get to the internal polarization beam splitter surface 16 as it undergoes total internal reflection will be reflected in a direction perpendicular to the optical surface 15b, so as to be then radiated to outside the prism 15.

On the other hand, since the angles B and A are geometrically equal to each other (B=A), the relation indicated by the equation (2):

$$A-2C=0 \tag{2}$$

holds, so that the angle A may be prescribed using the angle C, as indicated by the following equation (3):

$$A=2C \tag{3}$$

For example, if the image display apparatus 10 is designed with the angle of field on the order of 15 degrees, a pupil diameter of the order of 4 mm, and with the eye relief of the order of 20 mm, the angle C must be on the order of 20 degrees at the minimum. Thus, from the equation (3), an angle of the order of 40 degrees or larger is needed as the angle A. The angle A, prescribed in this manner by the angular extent of not less than 30 degrees and less than 90 degrees, is further prescribed by the angle C, that is, the shape of the prism 15.

The light path of the image light of the virtual-image optical system of the image display apparatus 10, getting to the viewer, will now be explained. The image light demonstrated on the image display device 11 and radiated therefrom is first passed through the relay lenses 12 to 14 to be incident on the incident optical surface 15a of the prism 15.

The image light incident on and proceeding in the prism 15 undergoes a first internal total reflection on the first optical surface 15b, then undergoes a second internal total reflection on the second optical surface 15c and then undergoes a third internal total reflection on the first optical surface 15b again before being incident on the polarization beam splitter surface 16.

The polarization beam splitter surface 16 reflects the image light, as the S linearly polarized light, in a direction towards the first optical surface 15b. The image light, not satisfying the conditions for total reflection, is radiated to outside the prism 15 to fall on the quarter wave plate 17, which then transforms the S linearly polarized light into left-handed circularly polarized light. The image light, converted into the left-handed circularly polarized light, is reflected by the concave mirror 18 and turned into right-handed circularly polarized light so as to be again incident on the quarter wave plate 17. The image light, as the right-handed circularly polarized light, is converted by the quarter wave plate 17 into P linearly polarized light, which is then incident on the prism 15 and transmitted through the polarization beam splitter surface 16 to get to the optical pupil 19 where the viewer's pupil is.

With the above-described image display apparatus 10, in which the angle A the optical axis of the optical surface 15a of the prism 15 makes with the first optical surface 15b or the second optical surface 15c is set so as to be not less than 30 degrees and less than 90 degrees, the optical components of the virtual-image optical system may be arranged not on a straight line but so as to conform to the shape of the viewer's face.

Moreover, by guiding the image light by total internal reflection within the prism 15, the light utilization efficiency may be higher than in a virtual-image optical system in which light is guided by, e.g., a reflective mirror.

Second Embodiment

Figure 8:
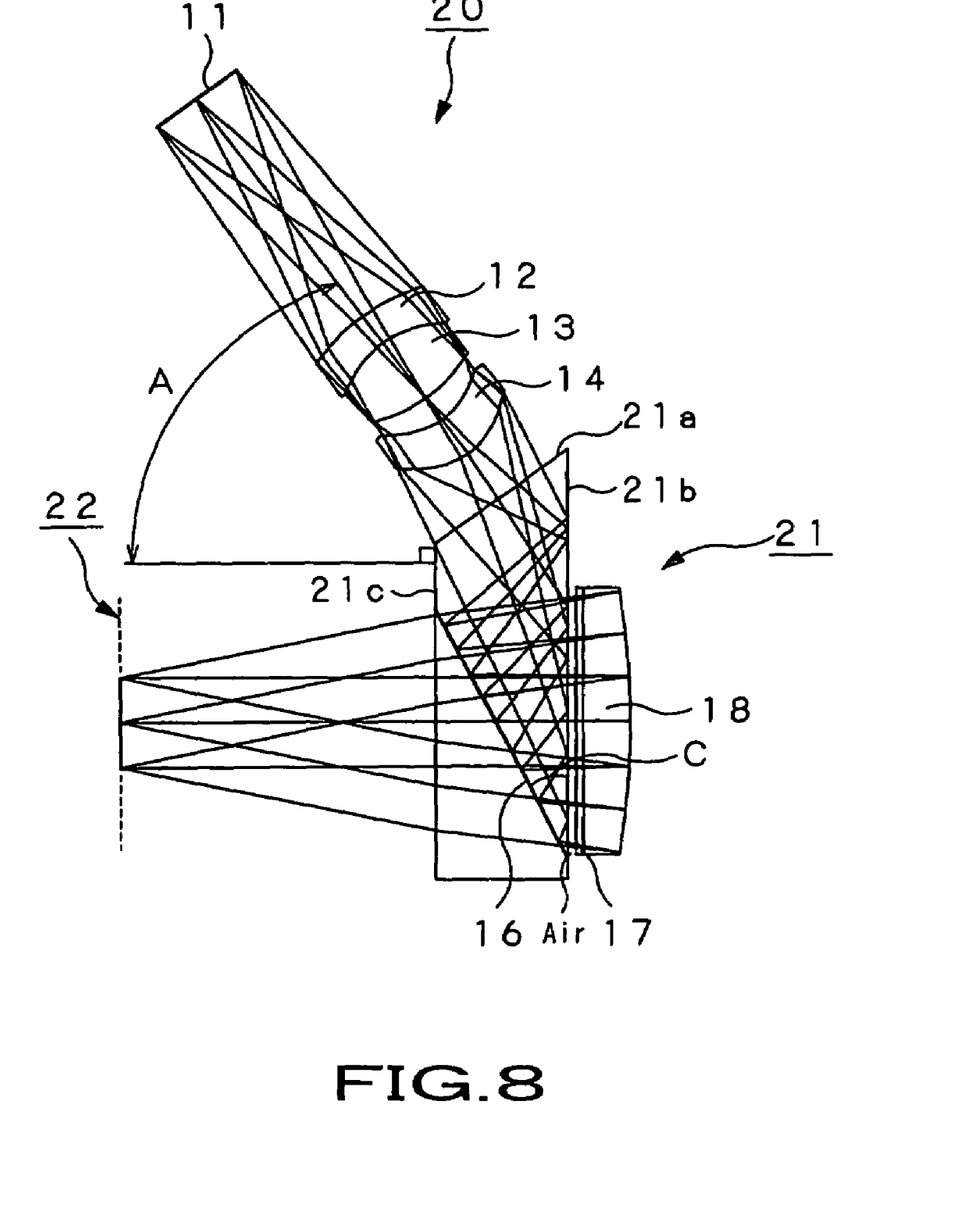
FIG. 8 is a plan view showing a second embodiment of an image display apparatus according to the present invention.

Referring to FIG. 8, a second embodiment of the picture display apparatus according to the present invention will now be explained in detail. An image display apparatus 10 includes a prism 21 in place of the prism 15 of the image display apparatus 10 explained with reference to FIG. 6. Meanwhile, since the image display apparatus 20 may be identified with the image display apparatus 10 except using the prism 21 in place of the prism 15, the same reference numerals are used to depict the same parts or components and for simplicity a detailed explanation is omitted.

The prism 21 is shorter in length than the prism 15, so that the image light radiated from the image display device 11 to fall on an incident optical surface 21 does not form an intermediate image within the prism 21 and undergoes internal total reflection only once by a first optical surface 21b, without undergoing internal total reflection on the second optical surface 21c, so as to be incident on the polarization beam splitter surface 16.

The angular extent of not less than 30 degrees and less than 90 degrees, as defined for the image display apparatus 10 of the previous embodiment, may directly be applied to the image display apparatus 20. Additionally, since the virtual-image optical system of the image display apparatus 20 is also the co-axial optical system, the relationship between the angles A and C, indicated by the above equation (3), similarly holds for the angle C between the polarization beam splitter surface 16 and the first optical surface 21b of the image display apparatus 20.

The light path of the image light reaching the viewer in the virtual-image optical system provided to the image display apparatus 20 will now be explained. The image light demonstrated on the image display device 11 and radiated therefrom is first passed through the relay lenses 12 to 14 to be incident on the incident optical surface 21a of the prism 21.

The image light incident on and proceeding into the prism 21 undergoes internal total reflection only once on the first optical surface 21b to then fall on the polarization beam splitter surface 16.

The polarization beam splitter surface 16 reflects the image light, as S linearly polarized light, towards the first optical surface 21b. The image light, not satisfying the conditions for total reflection, is radiated to outside the prism 21 to fall on the quarter wave plate 17, which then converts the S linearly polarized light into left-handed circularly polarized light. The image light, converted into the left-handed circularly polarized light, is reflected by the concave mirror 18 and turned into right-handed circularly polarized light so as to be again incident on the quarter wave plate 17. The image light, as the right-handed circularly polarized light, is converted by the quarter wave plate 17 into P linearly polarized light, which is then incident on the prism 15 and transmitted through the polarization beam splitter surface 16 to get to an optical pupil 22 where the viewer's pupil is.

With the above-described image display apparatus 20, in which the angle A, the optical axis of the optical surface 21a of the prism 21 makes with the first optical surface 21b or the second optical surface 21c, is set so as to be not less than 30 degrees and less than 90 degrees, the optical components of the virtual-image optical system may be arranged not on a straight line but so as to conform to the shape of the viewer's face.

Moreover, by guiding the image light by total internal reflection within the prism 15, the light utilization efficiency may be higher than in a virtual-image optical system in which light is guided by, e.g., a reflective mirror.

In addition, the image display apparatus 20, in which image light is guided so as to undergo total reflection in the prism 21 only once and so as not to form an intermediate image, may be reduced in size and weight as compared to the image display apparatus 10.

Third Embodiment

Figure 9:
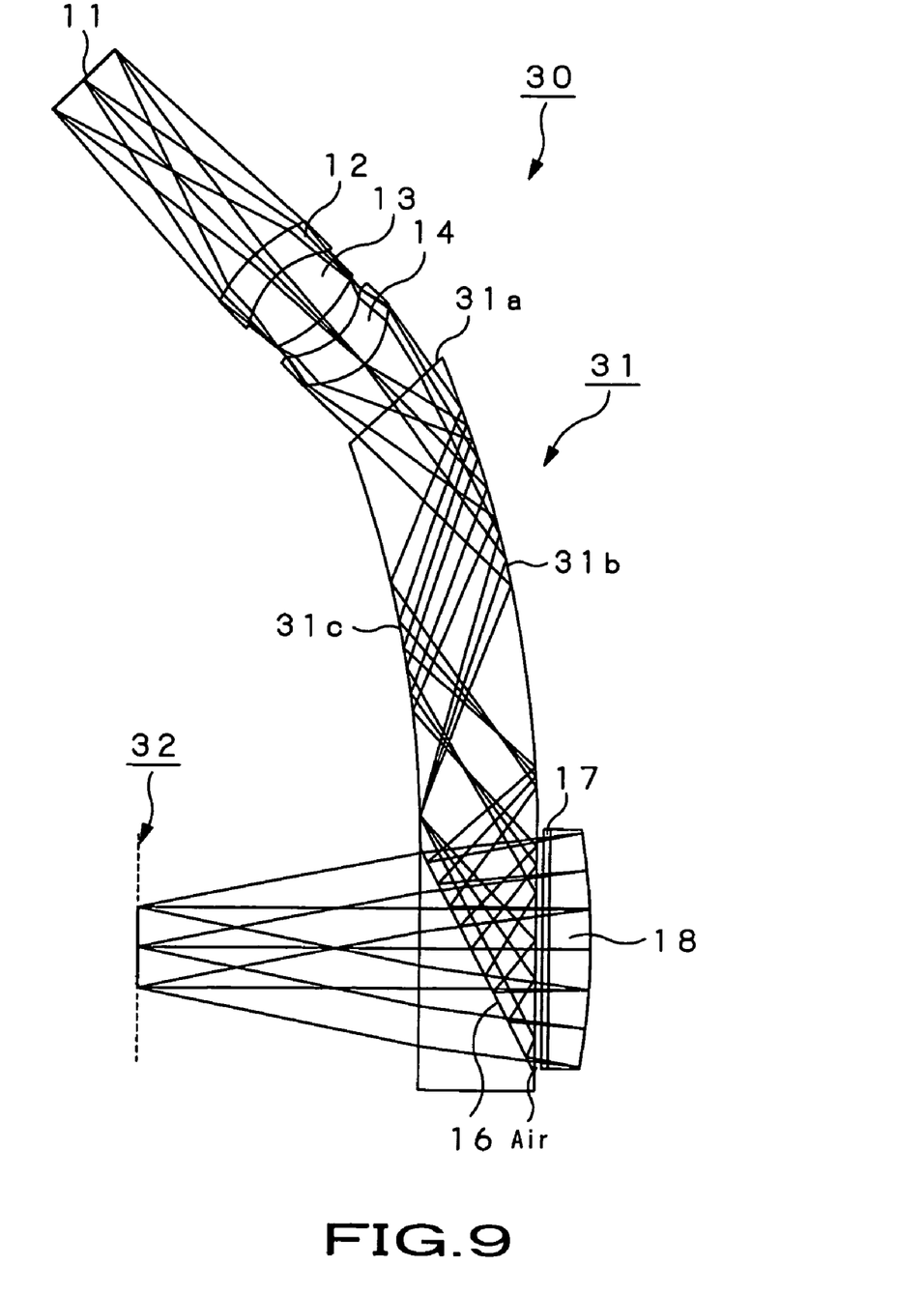
FIG. 9 is a plan view showing a third embodiment of an image display apparatus according to the present invention.

Referring to FIG. 9, a third embodiment of the picture display apparatus according to the present invention will now be explained in detail. An image display apparatus 30 includes a prism 31 in place of the prism 15 of the image display apparatus 10 explained with reference to FIG. 6. Since the image display apparatus 20 may be identified with the image display apparatus 10 except for using the prism 31 in place of the prism 15, the same reference numerals are used to depict the same parts or components and for simplicity a detailed explanation is omitted.

The prism 31 is a prism in which image light incident on an incident optical surface 31a is guided, as the image light undergoes internal total reflection, by a first optical curved surface 31b and a second optical curved surface 31c, as parallel curved surfaces, instead of by the plan-parallel first and second optical surfaces 15b and 15c of the prism 15. An intermediate image is formed in the prism 31, as in the prism 15.

The virtual-image optical system, as the image display apparatus 30, having such prism 31 is not a co-axial optical system in which the optical axes of the optical components are all coincident, as in the image display apparatus 10, but is an offset optical system having offset optical axes. With the image display apparatus 30, such an optical arrangement conforming to the face shape of the viewer is realized by using the prism 31 having the first optical curved surface 31b and the second optical curved surface 31c in the virtual-image optical system.

The light path of the image light of the virtual-image optical system, provided to the image display apparatus 30, getting to the viewer, will now be explained. The image light demonstrated on the image display device 11 and radiated therefrom is first passed through the relay lenses 12 to 14 to be incident on the incident optical surface 31a of the prism 31.

The image light incident on and proceeding into the prism 31 undergoes a first internal total reflection on the first optical surface 31b, then undergoes a second internal total reflection on the second optical surface 31c and then undergoes a third internal total reflection on the first optical surface 31b again before being incident on the polarization beam splitter surface 16.

The polarization beam splitter surface 16 reflects the image light, as the S linearly polarized light, in a direction towards the first curved optical surface 31b. The image light, not satisfying the conditions for total reflection, is radiated to outside the prism 31 to fall on the quarter wave plate 17, which then transforms the S linearly polarized light into left-handed circularly polarized light. The image light, converted into the left-handed circularly polarized light, is reflected by the concave mirror 18 and turned into right-handed circularly polarized light so as to be again incident on the quarter wave plate 17. The image light, as the right-handed circularly polarized light, is converted by the quarter wave plate 17 into P linearly polarized light, which is then incident on the prism 31 and transmitted through the polarization beam splitter surface 16 to get to an optical pupil 32 where the viewer's pupil is.

With the image display apparatus 30 described above, there is provided the prism 31 having the first optical curved surface 31b and the second optical curved surface 32b, so that the optical components of the virtual-image optical system may be arranged not on a straight line but so as to conform to the shape of the viewer's face.

By guiding the image light by total internal reflection within the prism 31, the light utilization efficiency may be higher than in a virtual-image optical system in which light is guided by, e.g., a reflective minor.

Fourth Embodiment

Figure 10:
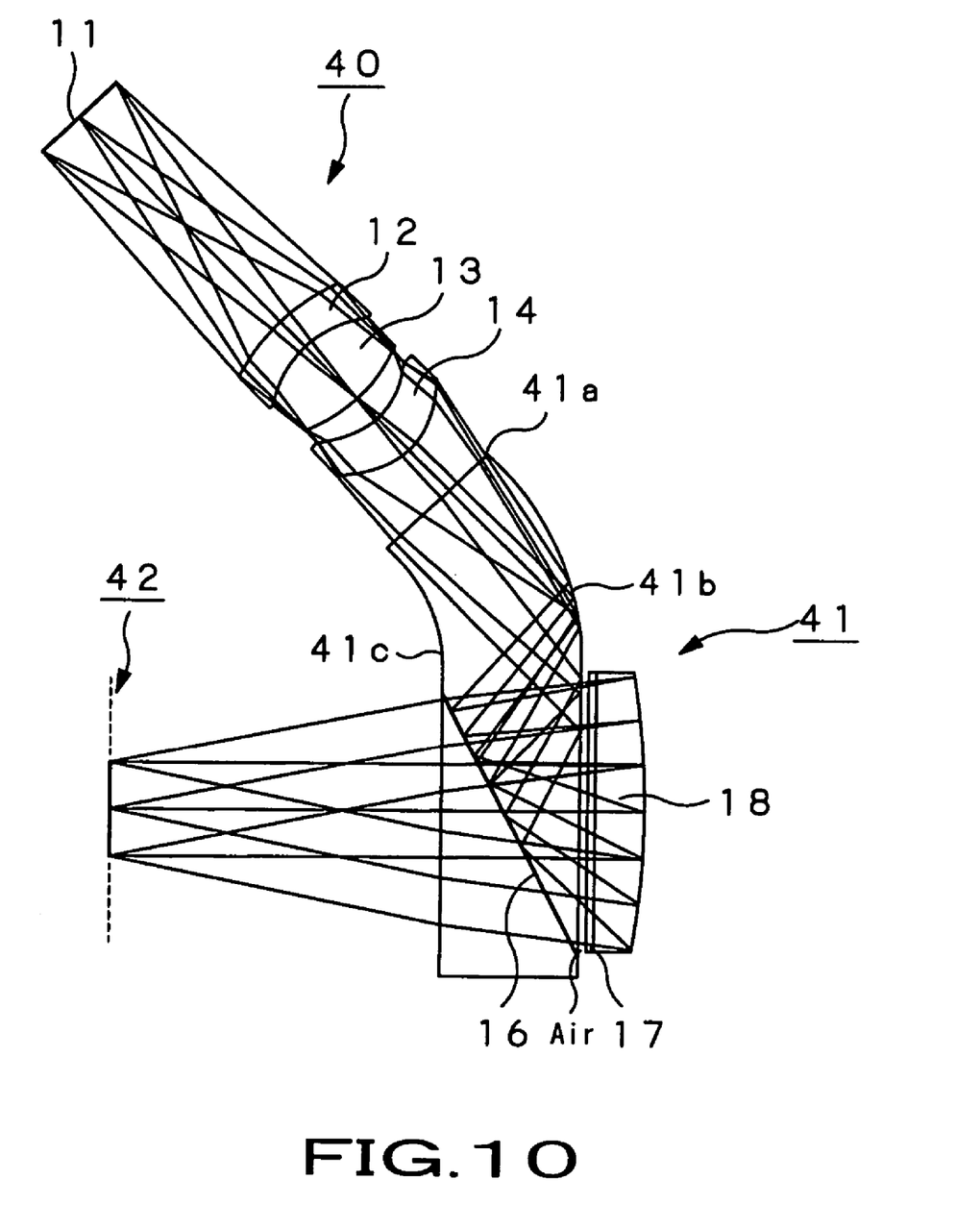
FIG. 10 is a plan view showing a fourth embodiment of an image display apparatus according to the present invention.

Referring to FIG. 10, a fourth embodiment of the picture display apparatus according to the present invention will now be explained in detail. An image display apparatus 40 includes a prism 41 in place of the prism 31 of the image display apparatus 30 explained with reference to FIG. 9. Meanwhile, since the image display apparatus 40 shown in FIG. 10 may be identified with the image display apparatus 30 except for using the prism 41 in place of the prism 31 of the image display apparatus 30, the same reference numerals are used to depict the same parts or components and for simplicity a detailed explanation is omitted.

The prism 41 is shorter in length than the prism 31, so that the image light radiated from the image display device 11 to fall on an incident optical surface 41a through relay lenses 12 to 14 does not form an intermediate image within the prism 41 and undergoes internal total reflection only once by a first optical surface 41b, without undergoing internal total reflection on a second optical surface 41c, so as to be incident on the polarization beam splitter surface 16.

The virtual-image optical system of the image display apparatus 40 having such prism 41 is an offset optical system having offset optical axes, as in the image display apparatus 30. With the image display apparatus 40, such an optical arrangement conforming to the face shape of the viewer is realized by using the prism 41 having the first optical surface 41b and the second optical surface 41c in the virtual-image optical system.

The light path of the image light of the virtual-image optical system of the image display apparatus 40, getting to the viewer, will now be explained. The image light demonstrated on the image display device 11 and radiated therefrom, is first passed through the relay lenses 12 to 14 to be incident on the incident optical surface 41a of the prism 41.

The image light incident on and proceeding into the prism 41 is subjected to internal total reflection on the first optical surface 41b only once and incident on the polarization beam splitter surface 16.

The polarization beam splitter surface 16 reflects the image light, as S linearly polarized light, towards the first optical surface 41b. The image light departing from the conditions for total reflection is radiated to outside the prism 41 and incident on the quarter wave plate 17 where the S linearly polarized light is converted into left-handed circularly polarized light. The image light, thus converted into the left-handed circularly polarized light, is reflected by the concave mirror 18 where the light is converted into right-handed circularly polarized light, which is again incident on the quarter wave plate 17. The image light, as the right-handed circularly polarized light, is converted by the quarter wave plate 17 into P linearly polarized light, which then is incident on the prism 41 and transmitted through the polarization beam splitter surface 16 to get to the optical pupil 42 where the viewer's pupil is arranged.

With the above-described configuration of the image display apparatus 40 provided with the first optical surface 41b and the second optical surface 42b, the optical components of the virtual-image optical system may be arranged not on a straight line but so as to conform to the shape of the viewer's face.

Moreover, since the image light is guided by total internal reflection within the prism 41, the light utilization efficiency may be higher than in a virtual-image optical system in which light is guided by, e.g., a reflective mirror.

Although the incident optical surfaces 15a, 21a, 31a and 41a of the prisms 15, 21, 31 and 41 provided to the image display apparatus 10, 20, 30 and 40, respectively, are stated to be planar, these may also be spherically-shaped in order to improve aberration characteristics.

The present invention is not limited to the above embodiment explained with reference to the drawings and, as will be apparent to those skilled in the art, various changes, substitutions or equivalents may be attempted without departing from the scope of the invention as defined in the claims.

The invention claimed is:

1. An image display apparatus comprising
an image display device for demonstrating an image;
a relaying optical system for relaying image light of said image demonstrated on said image display device;
a prism at least including a first planar optical surface, a second planar optical surface arranged substantially parallel to said first planar optical surface on a side towards an optical pupil, an incident planar optical surface which has an optical axis including an angle of not less than 30 degrees and less than 90 degrees with a normal to said first planar optical surface or to the second planar optical surface and on which is incident said image light relayed by said relaying optical system, and a reflective transmitting surface having a preset tilt relative to said first planar optical surface or said second planar optical surface and adapted for reflecting or transmitting said image light incident thereon from said incident optical surface;
a reflective optical component arranged on a side towards said first planar optical surface of said prism and configured for reflecting said image light reflected on said reflective transmitting surface and radiated from said first planar optical surface towards said reflective transmitting surface as a substantially collimated light beam; and
a phase difference optical component arranged on a light path of said first planar optical surface of said prism and said reflective optical component, sandwiching an air layer between the phase difference optical component and said first planar optical surface or said reflective optical component, said phase difference optical component transforming the state of polarization of said image light;
said prism guiding said image light, incident on and proceeding into said prism from said incident optical surface, up to said reflective transmitting surface, as said image light undergoes internal total reflection on said first planar optical surface and on said second planar optical surface, an intermediate image of said image being formed in the course of the guiding of said image light.

2. The image display apparatus according to claim 1 wherein a virtual-image optical system of the image display apparatus, including said prism, said reflective transmitting surface of said prism, said reflective optical component and the phase difference optical component, is a coaxial optical system with the optical axes of optical surfaces all being coincident with one another.

3. The image display apparatus according to claim 2 wherein an angle A defined between said optical axis of said incident planar optical surface and a normal to said first planar optical surface or a normal to said second planar optical surface and an angle C defined between said reflective transmitting surface of said prism and said first planar optical surface satisfy the following equation (1)

$$A=2C \qquad (1).$$

4. The image display apparatus according to claim 1 wherein said reflective optical component is a concave mirror arranged on a side towards said first planar optical surface so that a concave reflective surface is directed to said optical pupil.

5. The image display apparatus according to claim 1 wherein said reflective optical component is a holographic optical component arranged on a side towards said first planar optical surface so that a holographic surface thereof directs to said optical pupil.

6. An image display apparatus comprising
an image display device for demonstrating an image;
a relaying optical system for relaying image light of said image demonstrated on said image display device;
a prism at least including a first planar optical surface, a second planar optical surface arranged substantially parallel to said first planar optical surface on a side towards an optical pupil, an incident optical surface which has an optical axis including an angle of not less than 30 degrees and less than 90 degrees with a normal to said first planar optical surface or to a normal to said second planar optical surface and on which is incident said image light relayed by said relaying optical system, and a reflective transmitting surface having a preset tilt relative to said first planar optical surface or said second planar optical surface and adapted for reflecting or transmitting said image light incident thereon from said incident optical surface;

a reflective optical component arranged on a side towards said first planar optical surface of said prism and configured for reflecting said image light, reflected on said reflective transmitting surface and radiated from said first planar optical surface towards said reflective transmitting surface, as a substantially collimated light beam; and a phase difference optical component arranged on a light path of said first planar optical surface of said prism and said reflective optical component, sandwiching an air layer between the phase difference optical component and said first planar optical surface or said reflective optical component, said phase difference optical component transforming the state of polarization of said image light;

said prism guiding said image light, incident on and proceeding into said prism from said incident optical surface, up to said reflective transmitting surface, as said image light undergoes internal total reflection on said first planar optical surface.

7. The image display apparatus according to claim 6 wherein a virtual-image optical system of the image display apparatus, including said prism, said reflective transmitting surface of said prism, said reflective optical component and the phase difference optical component is a coaxial optical system with the optical axes of optical surfaces all being coincident with one another.

8. The image display apparatus according to claim 7 wherein an angle A defined between said optical axis of said incident optical surface and a normal to said first planar optical surface or a normal to said second planar optical surface and an angle C defined between said reflective transmitting surface of said prism and said first planar optical surface satisfy the following equation (1)

$$A=2C \quad (1).$$

9. The image display apparatus according to claim 6 wherein said reflective optical component is a concave mirror arranged on a side towards said first planar optical surface so that a concave reflective surface is directed to said optical pupil.

10. The image display apparatus according to claim 6 wherein said reflective optical component is a holographic optical component arranged on a side towards said first planar optical surface so that a holographic surface thereof directs to said optical pupil.

11. An image display apparatus comprising
an image display device for demonstrating an image;
a relaying optical system for relaying image light of said image demonstrated on said image display device;
a prism at least including a first curved optical surface, a second curved optical surface arranged substantially parallel to said first curved optical surface on a side towards an optical pupil, an incident optical surface on which is incident said image light relayed by said relaying optical system, and a reflective transmitting surface having a preset tilt relative to said first curved optical surface and said second curved optical surface and adapted for reflecting or transmitting said image light incident thereon from said incident optical surface;
a reflective optical component arranged on a side towards said first curved optical surface of said prism and configured for reflecting said image light reflected on said reflective transmitting surface and radiated from said first curved optical surface towards said reflective transmitting surface as a substantially collimated light beam; and a phase difference optical component arranged on a light path of said first curved optical surface of said prism and said reflective optical component, sandwiching an air layer between the phase difference optical component and said first curved optical surface or said reflective optical component, said phase difference optical component transforming the state of polarization of said image light;

said prism guiding said image light, incident on and proceeding into said prism from said incident optical surface, up to said reflective transmitting surface, as said image light undergoes internal total reflection on said first curved optical surface and on said second curved optical surface, an intermediate image of said image being formed in the course of the guiding of said image light.

12. The image display apparatus according to claim 11 wherein said reflective optical component is a concave mirror arranged on a side towards said first curved optical surface so that a concave reflective surface is directed to said optical pupil.

13. The image display apparatus according to claim 11 wherein said reflective optical component is a reflective holographic optical component arranged on a side towards said first curved optical surface so that a holographic surface thereof directs to said optical pupil.

14. An image display apparatus comprising
an image display device for demonstrating an image;
a relaying optical system for relaying image light of said image demonstrated on said image display device;
a prism at least including a first curved optical surface, a second curved optical surface arranged substantially parallel to said first curved optical surface on a side towards an optical pupil, an incident optical surface on which is incident said image light relayed by said relaying optical system, and a reflective transmitting surface having a preset tilt relative to said first curved optical surface and said second curved optical surface and adapted for reflecting or transmitting said image light incident thereon from said incident curved optical surface;
a reflective optical component arranged on a side towards said first curved optical surface of said prism and configured for reflecting said image light reflected on said reflective transmitting surface and radiated from said first curved optical surface towards said reflective transmitting surface as a substantially collimated light beam; and
a phase difference optical component arranged on a light path of said first curved optical surface of said prism and said reflective optical component, sandwiching an air layer between the phase difference optical component and said first curved optical surface or said reflective optical component, said phase difference optical component transforming the state of polarization of said image light;
said prism guiding said image light, incident on and proceeding into said prism from said incident optical surface, up to said reflective transmitting surface, as said image light undergoes internal total reflection on said first curved optical surface.

15. The image display apparatus according to claim 14 wherein said reflective optical component is a concave mirror arranged on a side towards said first curved optical surface so that a concave reflective surface is directed to said optical pupil.

16. The image display apparatus according to claim 14 wherein said reflective optical component is a reflective holographic optical component arranged on a side towards said first curved optical surface so that a holographic surface thereof directs to said optical pupil.

* * * * *